United States Patent [19]

Slabinski

[11] Patent Number: 4,503,549

[45] Date of Patent: Mar. 5, 1985

[54] INTERPOLATING FUNCTION GENERATOR FOR TRANSMITTER SQUARE ROOT EXTRACTION

[75] Inventor: Chet J. Slabinski, Chagrin Falls, Ohio

[73] Assignee: The Babcock & Wilcox Company, New Orleans, La.

[21] Appl. No.: 399,154

[22] Filed: Jul. 16, 1982

[51] Int. Cl.[3] ........................ G06G 7/20; G06F 7/38; G06F 7/62

[52] U.S. Cl. ........................................ 377/49; 377/39; 328/143; 328/144; 364/752

[58] Field of Search .................... 377/49, 39; 328/143, 328/144; 364/752

[56] References Cited

U.S. PATENT DOCUMENTS 3,566,095 2/1971 Schmitz .............................. 364/752

3,621,403 11/1971 Seiy ...................................... 377/39

4,229,795 10/1980 Vieweg et al. ......................... 377/49

4,339,657 7/1982 Larson et al. ......................... 377/39

4,420,814 12/1983 Arikawa et al. ...................... 377/39

*Primary Examiner*—John S. Heyman

*Attorney, Agent, or Firm*—Vytas R. Matas; Robert J. Edwards

[57] ABSTRACT

A function generator for extracting the square root or other function of a pulse width modulated input signal is disclosed. The function generator utilizes a ROM table (12) which contains values of the inverse of the desired function. Two eight-bit counters (26, 28) are clocked in proportion to the duty cycle of the input signal and the duty cycle of a flip-flop (22), which is related to the output of the ROM (12). The counters (26, 28) keep a running average of the comparison of the foregoing duty cycles and, in turn, cause a four-bit up/down counter (30) and the ROM (12) to cycle in time between the value in the ROM (12) above and below the exact input value. In this manner, the output of a four-bit up/down counter (30) is an accurate interpolated representation of the square root of the input signal.

9 Claims, 1 Drawing Figure

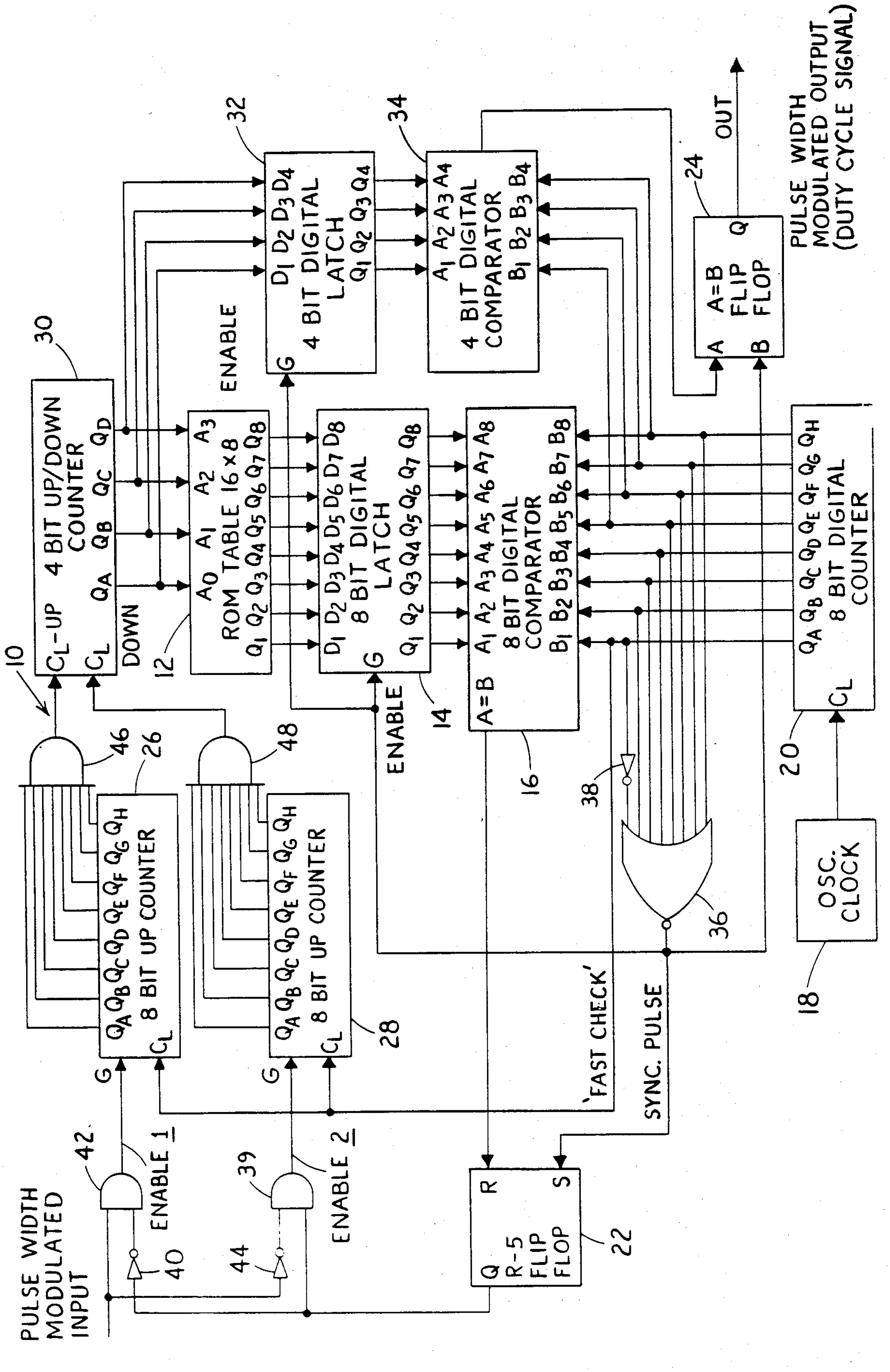
PULSE WIDTH MODULATED INPUT
ENABLE 1
ENABLE 2
42
39
40
44
8 BIT UP COUNTER
26
28
46
48
10
4 BIT UP/DOWN COUNTER
30
DOWN
ROM TABLE 16×8
12
8 BIT DIGITAL LATCH
14
ENABLE
4 BIT DIGITAL LATCH
32
4 BIT DIGITAL COMPARATOR
34
8 BIT DIGITAL COMPARATOR
16
A=B
8 BIT DIGITAL COUNTER
20
OSC. CLOCK
18
A=B FLIP FLOP
24
OUT
PULSE WIDTH MODULATED OUTPUT (DUTY CYCLE SIGNAL)
'FAST CHECK'
38
36
SYNC. PULSE
R-5 FLIP FLOP
22

INTERPOLATING FUNCTION GENERATOR FOR TRANSMITTER SQUARE ROOT EXTRACTION

TECHNICAL FIELD

This invention generally relates to a function generator and more particularly to a function generation system for square root extraction that uses digital interpolation techniques to increase accuracy.

BACKGROUND ART

Presently, methods for function generation typically employ analog nonlinear amplifyingcircuits or digital computational hardware to perform an approximation algorithm. For analog square root extraction, usually some form of multiplier circuit in a feedback arrangement is used. The accuracy of the analog function generator is limited by circuitry errors and drifts unless elaborate means are utilized to compensate for same. Such means are typically very expensive to implement. As for digital techniques for function generation, the accuracy of such techniques is generally determined by the word size being processed so that a high degree of accuracy requires a large word size which, in turn, requires extensive circuitry to implement. In addition, the interfacing of the sensor and output driver circuitry requires additional circuitry which increases the overall size of the system and introduces more inaccuracies therein. In view of the foregoing, it is apparent that for transmitter applications where small size and low power consumption are required, the aforementioned conventional techniques are not appropriate.

Because of inherent problems associated with the prior art, it has become desirable to develop a relatively simple and inexpensive highly accurate function generator for extracting the square root of an input signal.

SUMMARY OF THE INVENTION

The present invention solves the aforementioned problems associated with the prior art as well as other problems by providing a highly accurate function generator which extracts the square root of a pulse width modulated input signal. The primary element of this function generator is a ROM table which contains a number of discrete values for the inverse of the desired function. The ROM address represents the desired function of the input signal and the output of the ROM is the square of the input address. The output of the ROM is continuously converted to a pulse width modulated signal by a flip-flop and a digital comparator.

Two eight-bit counters are clocked in proportion to the duty cycle of the pulse width modulated input signal and the duty cycle of the output signal of the flip-flop. Thus, these eight-bit counters keep a running average of the comparison between these duty cycles and, in turn, cause a four-bit up/down counter to set the ROM's address, such that the ROM's output cycles in time between the value in the ROM above and below the exact input value. The output of the circuit, which is derived from the output of the four-bit up/down counter, is a pulse width modulated signal whose average value is the square root of the input signal.

In essence, the technique utilized in the present invention can be described as a digital-technique for "time-sharing" stored accurate values of the desired function in a manner proportional to the amount the input signal differs from the stored values, thus achieving an accurate digital interpolation of the function.

BRIEF DESCRIPTION OF THE DRAWING

FIG. 1 is an electrical schematic of the present invention.

DESCRIPTION OF THE PREFERRED EMBODIMENT

Referring now to the drawing where the illustration is for the purpose of describing the preferred embodiment of the present invention and is not intended to limit the invention hereto, FIG. 1 is a schematic diagram of the circuit 10 used by the present invention. Circuit 10 is comprised of a ROM table 12, an eight-bit latch 14, an eight-bit comparator 16, a clock generator 18, an eight-bit counter 20, flip-flops 22 and 24, eight-bit up counters 26 and 28, a four-bit up/down counter 30, a four-bit latch 32, and a four-bit comparator 34.

The ROM table 12 has contained therein a number of discrete values for the inverse of the desired function. The ROM address (inputs $A_0$ through $A_3$) represents the input variable received from the four-bit up/down down counter 30, and the output of the ROM table 12, obtained from outputs $Q_1$ through $Q_8$ thereon, is the inverse function of the input. Specifically, if a square root output is desired, the ROM table 12 generates the exact square of the four-bit input address, which is an eight-bit output word.

The outputs of the ROM table 12, i.e., outputs $Q_1$ through $Q_8$ thereof, are respectively connected to the inputs $D_1$ through $D_8$ to the eight-bit latch 14 whose outputs, $Q_1$ through $Q_8$, are respectively connected to the inputs $A_1$ through $A_8$ to the eight-bit comparator 16. The other set of inputs to the eight-bit comparator 16, i.e., inputs $B_1$ through $B_8$, are respectively connected to the outputs $Q_A$ through $Q_H$ of the eight-bit counter 20. Outputs $Q_B$ through $Q_H$ of the counter 20 are connected directly to the inputs to a NOR gate 36, whereas output $Q_A$ of the counter 20 is connected to this gate 36 via an inverter 38. Outputs $Q_E$ through $Q_H$ of the counter 20 are also connected to the $B_1$ through $B_4$ inputs to the four-bit comparator 34. The output of the clock generator 18 is connected to the clock (CL) input to the eight-bit counter 20.

The output of the NOR gate 36 delivers a synchronization pulse to the SET input to the flip-flops 22 and 24 and to the ENABLE inputs (G) to the eight-bit latch 14 and the four-bit latch 32. The RESET input to the flip-flop 22 is connected to the A=B output terminal of the eight-bit comparator 16. The Q output of the flip-flop 22 is connected to an input to an AND gate 39 and to the input to an inverter 40 whose output is connected to an input to another AND gate 42. The pulse width modulated input signal is connected to the other input to the AND gate 42 whose output is, in turn, connected to the ENABLE input (G) to the eight-bit up counter 26. The foregoing input signal is also connected to the input to an inverter 44 whose output is connected to the other input to the AND gate 39. The output of the AND gate 39 is connected to the ENABLE input (G) to the eight-bit up counter 28. The clock (CL) inputs to both of these counters 26 and 28 are connected to the $q_A$ output of the eight-bit counter 20. The outputs of these counters 26 and 28, i.e., outputs $Q_A$ through $Q_H$, are connected to the inputs to AND gates 46 and 48, respectively. The output of AND gate 46, is, in turn, connected to the UP input to the four-bit up/down counter 30, whereas the output of AND gate is connected to the DOWN input to this counter 30.

The outputs of the four-bit up/down counter 30, i.e., outputs $Q_A$ through $Q_D$ thereon, are respectively connected to the ROM address inputs $A_0$ through $A_3$ and to the inputs $D_1$ through $D_4$ to the four-bit latch 32 whose outputs $Q_1$ through $Q_4$, are respectively connected to the inputs $A_1$ through $A_4$ to the four-bit comparator 34. The A=B output terminal of the four-bit comparator 34 is connected to the RESET input to the flip-flop 24. The Q output of the flip-flop 24 is the output of the circuit 10 and a pulse width modulated output signal is produced thereat.

At the start of a cycle, the value of the input to the ROM table 12 is governed by the output of the four-bit up/down counter 30. A cycle consists of a series of repetitive operations controlled by the clock generator 18 whose frequency is selected for the specific application. The pulses produced by the clock generator 18 are received by the eight-bit counter 20 via the CLOCK (CL) input terminal and causes the counter 20 to continuously and repetitively count to 256 in a binary manner. At the start of each cycle, the generation of a digital (1) at the $Q_A$ output terminal of the digital counter 20 causes the inverter 38 to produce a digital (0) at one of the inputs to the NOR gate 36 which, in turn, causes this gate to produce a digital (1) at its output. This digital pulse is used as a synchronizing pulse at the start of each cycle and sets the flip-flops 22 and 24, and enables the eight-bit latch 14 and the four-bit latch 32. The enabling pulse to the eight-bit latch 14 causes this latch to accept and hold the output of the ROM table 12 which, in turn, is continuously compared by the eight-bit comparator 16 to the outputs $Q_A$ through $Q_H$ of the eight-bit counter 20. Similarly, the enabling pulse to the four-bit latch 32 causes this latch to accept and hold the output of the four-bit up/down counter 30 which, in turn, is continuously compared by the four-bit comparator 34 to the outputs $Q_E$ through $Q_H$ of the eight-bit counter 20.

The setting of the flip-flop 24 by the synchronizing pulse from the NOR gate 36 causes the flip-flop 24 to produce a digital (1) at its Q output. Similarly, the setting of the flip-flop 22 by this synchronizing pulse causes this device to produce a digital (1) at its output. This digital (1) is applied to one input to the AND gate 39 and to the inverter 40 which inverts same and applies a digital (0) to one input to the AND gate 42. When the pulse width modulated input signal is low, i.e., a digital (0), the inverter 44 causes a digital (1) to be applied to the other input to the AND gate 39 which causes this gate to produce a digital (1) at its output enabling the eight-bit up counter 28. Inasmuch as the AND gate 42 has a digital (0) applied to one of its inputs, the output of this gate is a digital (0) and the eight-bit up counter 26 is not enabled.

When enabled by the AND gate 39, the eight-bit up counter 28 counts upwardly one count each time a digital (1) is generated by the eight-bit counter 20 at its $Q_A$ output terminal. When the outputs of the eight-bit counter 20, which are applied to the $B_1$ through $B_8$ inputs to the eight-bit comparator 16, are determined to be equal to the output of the eight-bit latch 14 by the eight-bit comparator 16, a digital (1) is produced by the comparator 16 at its A=B terminal. This digital (1) is applied to the RESET input to the flip-flop 22 which resets same causing a digital (0) to be produced at its Q output. This digital (0) is then applied to the input to the AND gate 39 causing this gate 39 to produce a digital (0) at its output disabling the eight-bit up counter 28. The digital (0) produced at the Q output of the flip-flop 22 is also applied to the inverter 40 which causes a digital (1) to be applied to one input to the AND gate 42. Whenever the pulse width modulated input signal is high, i.e., a digital (1), this signal, applied to the other input to the AND gate 42, causes this gate to produce a digital (1) at its output, enabling the eight-bit up counter 26. When enabled by the AND gate 42, the counter 26 counts upwardly one count each time a digital (1) is generated by the eight-bit counter 20 at its $Q_A$ output terminal until the output of the flip-flop 22 is set by the synchronization pulse at the start of the next cycle.

When the four highest outputs of the eight-bit counter 20, i.e., outputs $Q_E$ through $Q_H$, are determined to be equal to the output of the four-bit latch 32 by the four-bit comparator 34, this comparator produces a digital (1) at its A=B terminal which causes the flip-flop 24 to reset and produce a digital (0) at its output. After the eight-bit counter 20 has completely cycled through its 256 counts, the entire foregoing sequence repeats. In this manner, the eight-bit up counters 26 and 28 continuously count upwardly during each cycle in relation to the ratio (or time) that the incoming pulse width modulated incoming signal is compared to the signal at the Q output of the flip-flop 22.

When the $Q_A$ through $Q_H$ outputs of the eight-bit counter 26 are all a digital (1), the AND gate 46 produces a digital (1) at its output which causes the four-bit up/down counter 30 to increase its output by one binary digit. This, in turn, causes the input to the ROM table 12 to be increased by one binary digit and also increases the digital value in the four-bit latch 32 by one binary digit. Conversely, when the $Q_A$ through $Q_H$ outputs of the eight-bit counter 28 are all a digital (1), the AND gate 48 produces a digital (1) at its output which causes the four-bit up/down counter 30 to decrease its output by one binary digit. This, in turn, causes the input to the ROM table 12 to be decreased by one binary digit and also decreases the digital value in the four-bit latch 32 by one binary digit. Thus, the eight-bit up counters 26 and 28 keep a running average of duty cycle comparison and cause: the four-bit up/down counter 30 and the ROM table 12 to cycle in time between the value in the ROM above and below the exact input value. The amount of time spent at each of the two closest values will be proportional to the time required to match the input signal on a running average basis.

Inasmuch as the average output of the flip-flop 22 will match and track the pulse width modulated input signal, the average of the ROM address (which is related to the ROM output by the desired function) is the desired function of the input. This ROM address is converted to a pulse width modulated output signal in a manner similar to the conversion of the ROM output for use in the duty cycle comparator. In this manner, a desired function of a pulse width modulated input signal can be generated digitally using only a small number of components.

Certain modifications and improvements will occur to those skilled in the art upon reading the foregoing. It should be understood that all such modifications and improvements have been deleted herein for the sake of conciseness and readability, but are properly within the scope of the following claims.

I claim:

1. A function generator for producing a function of an incoming signal comprising memory means containing values relating to the desired function of said incoming signal, first counter means producing a series of digital pulses, first means for comparing said digital pulses with said values relating to said desired function, said first comparing means producing an output signal when equality between the total of said digital pulses produced by said first counter means and said values relating to said desired function has been achieved, second means for comparing said output signal produced by said first comparing means with said incoming signal, said second comparing means producing an output signal proportional to the duty cycle of said incoming signal and the duty cycle of said output signal produced by said first comparing means causing said memory means to cycle about the value contained therein relating to said incoming signal wherein said second comparing means comprises second and third counter means each being selectively actuatable by said output signal produced by said first comparing means causing said second and third counter means to cycle in time proportional to the duty cycle of said incoming signal and the duty cycle of said output signal produced by said first comparing means.

2. The function generator as defined in claim 1 wherein said second counter means is actuatable by said first comparing means prior to equality being achieved between said total of said digital pulses produced by said first counter means and said values relating to said desired function, and said third counter means is actuatable by said first comparing means after equality has been achieved between said total of said digital pulses produced by said first counter means and said values relating to said desired function.

3. The function generator as defined in claim 1 wherein said second counter means is responsive to the absence of a digital pulse in said incoming signal and said third counter means is responsive to the presence of a digital pulse in said incoming signal.

4. The function generator as defined in claim 1 further including fourth counter means interposed between the outputs of said second and third counter means and the input to said memory means, said fourth counter means being caused to cycle in time about the value contained in said memory means relating to said incoming signal.

5. The function generator as defined in claim 4 further including third means for comparing the output of said fourth counter means with said digital pulses produced by said first counter means, said fourth counter means producing an output signal representative of the desired function of said incoming signal.

6. A function generator for extracting the square root of an incoming signal comprising memory means containing values relating to the desired square root function of said incoming signal, first counter means producing a series of digital pulses, first means for comparing said digital pulses with said values relating to said desired square root function, said first comparing means producing an output signal when equality between the total of said digital pulses produced by said first counter means and said values relating to said desired square root function has been achieved, second means for comparing said output signal produced by said first comparing means with said incoming signal, said second comparing means producing an output signal proportional to the duty signal of said incoming signal and the duty cycle of said output signal produced by said first comparing means, and third means for comparing the output signal of said second comparing means with said digital pulses produced by said first counter means producing an output signal representative of the square root of said incoming signal.

7. A function generator for extracting the square root of an incoming signal comprising memory means containing values relating to the desired square root function of the incoming signal, first counter means producing a series of digital pulses, first means for comparing said digital pulses with said values relating to said desired square root function, said first comparing means producing an output signal when equality between the total of said digital pulses produced by said first counter means and said values relating to said desired square root function has been achieved, second means for comparing said output signal produced by said first comparing means with said incoming signal, said second comparing means comprising second and third counter means each being selectively actuatable by said output signal produced by said first comparing means causing said second and third counter means to produce an output signal proportional to the duty cycle of said incoming signal and the duty cycle said output signal produced by said first comparing means, and third means for comparing said output signal produced by said second and third counter means with said digital pulses produced by said first counter means producing an output signal representative of the square root of said incoming signal.

8. The function generator as defined in claim 7 further including fourth counter means interposed between the outputs of said second and third counter means and the input to said memory means, said fourth counter means being caused to cycle in time about the value contained in said memory means relating to said incoming signal.

9. A function generator for extracting the square root of an incoming signal comprising memory means containing values relating to the desired square root function of said incoming signal, first counter means producing a series of digital pulses, first means for comparing said digital pulses with said values relating to said desired square root function, said first comparing means producing an output signal when equality between the total of said digital pulses produced by said first counter means and said values relating to said desired square root function has been achieved, second means for comparing said output signal produced by said first comparing means with said incoming signal, said second comparing means comprising second and third counter means, said second counter means being actuatable by said first comparing means prior to equality being achieved between said total of said digital pulses produced by said first counter means and said values relating to said desired square root function, said third counter means being actuatable by said first comparing means after equality has been achieved between said total of said digital pulses produced by said first counter means and said values relating to said desired square root function, said second and third counter means producing an output signal proportional to the duty cycle of said incoming signal and the duty cycle of said output signal of said first comparing means, fourth counter means interposed between the output of said second and third counter means and the input to said memory means, said fourth counter means and said memory means being caused to cycle in time about the value contained in said memory means relating to said incoming signal, and third means for comparing the output of said fourth counter means with said digital pulses produced by said first counter means, said fourth counter means producing an output signal representative of the square root of said incoming signal.

* * * * *